United States Patent
Yoshida

(10) Patent No.: US 9,599,817 B2
(45) Date of Patent: Mar. 21, 2017

(54) IMAGE DISPLAY APPARATUS

(71) Applicant: ALPS ELECTRIC CO., LTD., Tokyo (JP)

(72) Inventor: Toru Yoshida, Miyagi-Ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/496,615

(22) Filed: Sep. 25, 2014

(65) Prior Publication Data
US 2015/0085332 A1   Mar. 26, 2015

(30) Foreign Application Priority Data
Sep. 26, 2013 (JP) ................. 2013-199774

(51) Int. Cl.
G03H 1/22 (2006.01)
G03H 1/00 (2006.01)
G02B 27/01 (2006.01)
G03H 1/32 (2006.01)

(52) U.S. Cl.
CPC ......... *G02B 27/0103* (2013.01); *G02B 27/01* (2013.01); *G03H 1/2286* (2013.01); *G03H 1/2294* (2013.01); *G02B 2027/0118* (2013.01); *G03H 1/32* (2013.01); *G03H 2001/2284* (2013.01); *G03H 2222/18* (2013.01); *G03H 2240/51* (2013.01)

(58) Field of Classification Search
CPC .... G02B 27/0103; G03H 1/2286; G03H 1/32; G03H 2001/2284; G03H 2222/18; G03H 2240/51
USPC .......................................... 359/13
See application file for complete search history.

(56) References Cited

U.S. PATENT DOCUMENTS

2009/0296176 A1* 12/2009 Leister ................. G03H 1/2286
                                                                    359/9
2011/0176190 A1*  7/2011 Golan ...................... G03H 1/08
                                                                    359/9

FOREIGN PATENT DOCUMENTS

JP       2010-271554        12/2010

* cited by examiner

*Primary Examiner* — Bumsuk Won
*Assistant Examiner* — Grant Gagnon
(74) *Attorney, Agent, or Firm* — Brinks Gilson & Lione

(57) ABSTRACT

An image display apparatus includes at least one light source to emit coherent light, a holographic optical element to diffract the coherent light from the light source to produce image light, an optical mechanism to guide the image light from the holographic optical element, at least one detection unit to detect the intensity of the image light, and an adjustment unit to adjust the power of the light source based on the result of detection by the detection unit. An image based on the image light is observed by a viewer.

2 Claims, 7 Drawing Sheets

IMAGE DISPLAY APPARATUS

CLAIM OF PRIORITY

This application claims benefit of priority to Japanese Patent Application No. 2013-199774 filed on Sep. 26, 2013, which is hereby incorporated by reference in its entirety.

BACKGROUND

1. Field of the Disclosure

The present disclosure relates to an image display apparatus including a holographic optical element (hereinafter, also referred to as an "HOE").

2. Description of the Related Art

Image display apparatuses, such as a three-dimensional display, a head mounted display (HMD), and a head-up display (HUD), based on holography have been developed.

As an example of image display apparatuses used as HMDs, Japanese Unexamined Patent Application Publication No. 2010-271554 discloses an HOE display apparatus (image display apparatus) 909 including HOEs illustrated in FIG. 6A. FIGS. 6A and 6B are diagrams explaining the HOE display apparatus 909 as Related Art 1. FIG. 6A illustrates the configuration of the HOE display apparatus 909. FIG. 6B explains light emerging from a liquid crystal display (LCD) 913. As illustrated in FIG. 6A, the HOE display apparatus 909 includes an image display unit 901, the HOEs, i.e., an HOE 914 for display and an HOE 915 for detection, a brightness sensor (brightness detection unit) 916 to detect the brightness of sample light from the detection HOE 915, and a brightness adjustment unit 903. The image display unit 901 includes a light emitting diode (LED) 911, serving as a light source, the LCD 913, serving as a spatial modulation element, and an LCD driver 912. The brightness adjustment unit 903 includes an LED driver 918 and a digital signal processor (DSP) 917 to control the LED driver 918.

Referring to FIGS. 6A and 6B, the HOE display apparatus 909 is configured such that image light of the light emerging from the LCD 913 is guided to the display HOE 914 (refer to FIG. 6B) and sample light of the light is guided to the detection HOE 915 (refer to FIG. 6B). The sample light from the detection HOE 915 is detected by the brightness sensor 916. The LED driver 918 can adjust the power of the LED 911 based on the result of detection. The image light output from the image display unit 901 reaches a viewer 905, so that an image based on the image light obtained by adjustment can be visually identified by the viewer 905.

Japanese Unexamined Patent Application Publication No. 2010-271554 further describes a typical image display apparatus including no holographic optical element. FIG. 7A illustrates such an image display apparatus 700 as Related Art 2. As illustrated in FIG. 7A, the image display apparatus 700 includes an image display unit 701 including a light source, a brightness detection unit 702 to detect the brightness of sample light, and a brightness adjustment unit 703 to adjust brightness in the image display unit 701. Accordingly, the brightness adjustment unit 703 can adjust the intensity of light emitted from the image display unit 701 based on a result of detection by the brightness detection unit 702 so that the light intensity approaches a predetermined target value at which an optimum color balance is achieved. Image light emitted from the image display unit 701 reaches a viewer 705, so that an image based on the image light obtained by adjustment can be visually identified by the viewer 705.

Japanese Unexamined Patent Application Publication No. 2010-271554 further describes a typical image display apparatus including a holographic optical element. FIG. 7B illustrates such an image display apparatus 800 as Related Art 3. As illustrated in FIG. 7B, the image display apparatus 800 includes an image display unit 801 including a light source, a holographic optical element (or hologram optical element) 804 on which image light from the image display unit 801 is incident, a brightness detection unit 802 to detect the brightness of sample light from the image display unit 801, and a brightness adjustment unit 803 to adjust brightness in the image display unit 801. Accordingly, the brightness adjustment unit 803 can adjust the intensity of light emitted from the image display unit 801 based on a result of detection by the brightness detection unit 802 so that the light intensity approaches a predetermined target value at which an optimum color balance is achieved. Image light diffracted by the holographic optical element 804 reaches a viewer 805, so that an image based on the image light obtained by adjustment can be visually identified by the viewer 805.

As discussed in Japanese Unexamined Patent Application Publication No. 2010-271554, there is little difference in intensity between the image light and the sample light from the image display unit 701 in the image display apparatus 700 including no holographic optical element illustrated in FIG. 7A. The intensity of light from the image display unit 701 is adjusted based on the result of detection of the sample light without any problems. In the image display apparatus 800 including the holographic optical element illustrated in FIG. 7B, however, there is a large difference in intensity between the image light and the sample light because the image light leaving the holographic optical element 804 is diffracted light. It is significantly difficult to adjust the intensity of light from the image display unit 801 based on the result of detection of the sample light.

In the HOE display apparatus 909 according to Related Art 1 disclosed in Japanese Unexamined Patent Application Publication No. 2010-271554, the detection HOE 915 is disposed on an optical path of the sample light and the intensity of light from the image display unit 901 is adjusted based on the sample light from the detection HOE 915. Since each of the image light and the sample light is light leaving the holographic optical element, there is little difference in intensity between the image light and the sample light. Thus, appropriate adjustment may be achieved.

The area of an image displayed on a display screen is inversely proportional to the brightness of the displayed image. If the area of each display image component included in a displayed image varies from image to image, the brightness of the display image component significantly varies depending on the area thereof in the method of adjusting the intensity of light as in Related Art 2 or Related Art 3.

In the HOE display apparatus 909 according to Related Art 1, each of the image light and the sample light is light leaving the holographic optical element. As illustrated in FIG. 6B, however, the image light distinctly differs from the sample light in, for example, the direction of traveling and an image projected based on the light. Japanese Unexamined Patent Application Publication No. 2010-271554 discusses that the intensity and wavelength of the sample light, which is diffracted light, reaching the brightness sensor 916 differ from those of the image light reaching the viewer 905. Accordingly, the brightness of an image displayed on a display screen of the HOE display apparatus 909 according to Related Art 1 significantly varies depending on the area of the image. Disadvantageously, this results in significant unevenness in brightness of the image to be visually identified.

SUMMARY

The present invention provides an image display apparatus including at least one light source to emit coherent light, a holographic optical element to diffract the coherent light from the light source to produce image light, an optical mechanism to guide the image light from the holographic optical element, at least one detection unit to detect the intensity of the image light, and an adjustment unit to adjust the power of the light source based on the result of detection by the detection unit. An image based on the image light is visually identified by a viewer.

DESCRIPTION OF THE EXEMPLARY EMBODIMENTS

Embodiments of the present invention will be described below with reference to the drawings.

Figure 1:
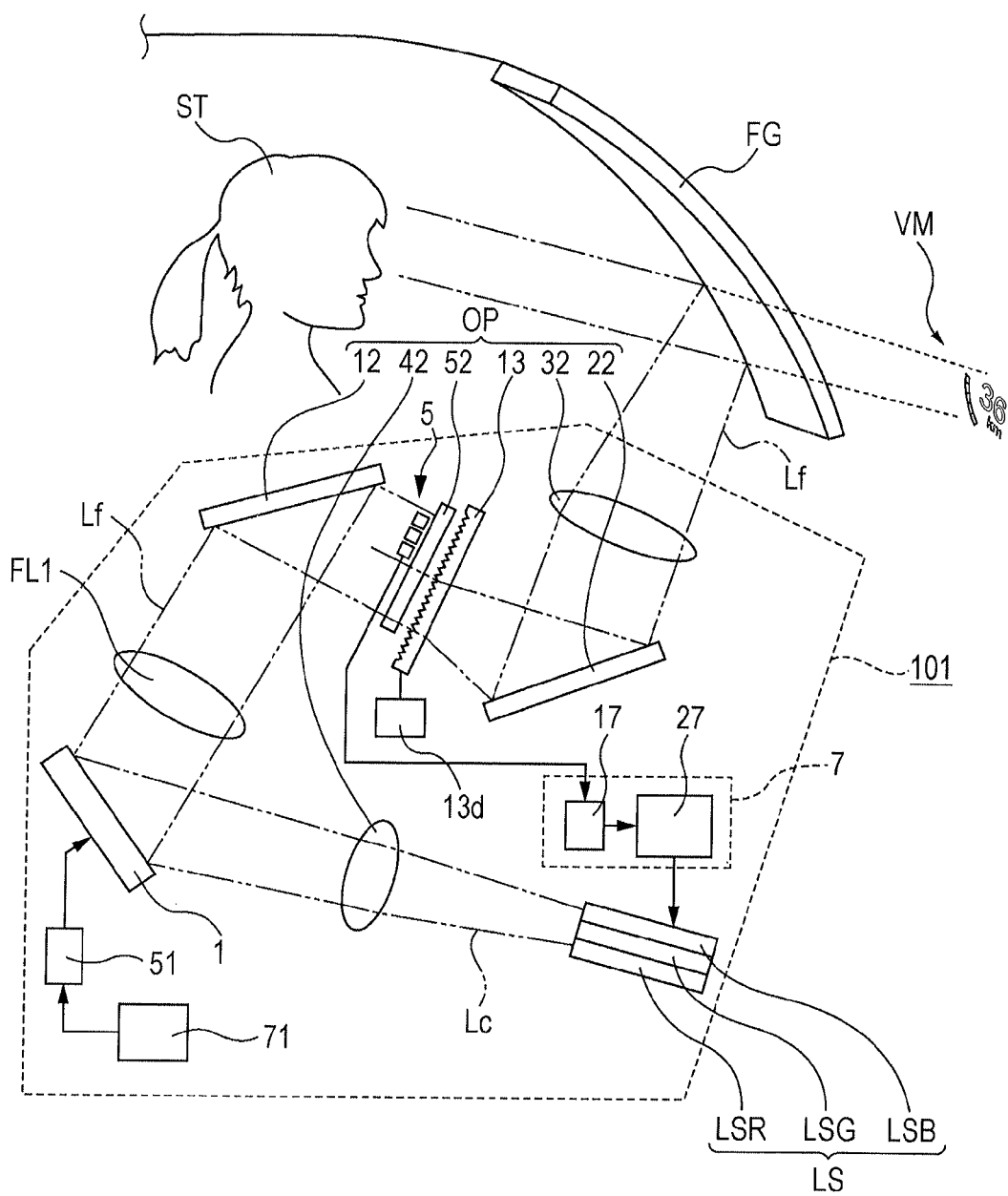
FIG. 1 is a schematic diagram explaining an image display apparatus according to a first embodiment of the present invention.
Figure 2A:
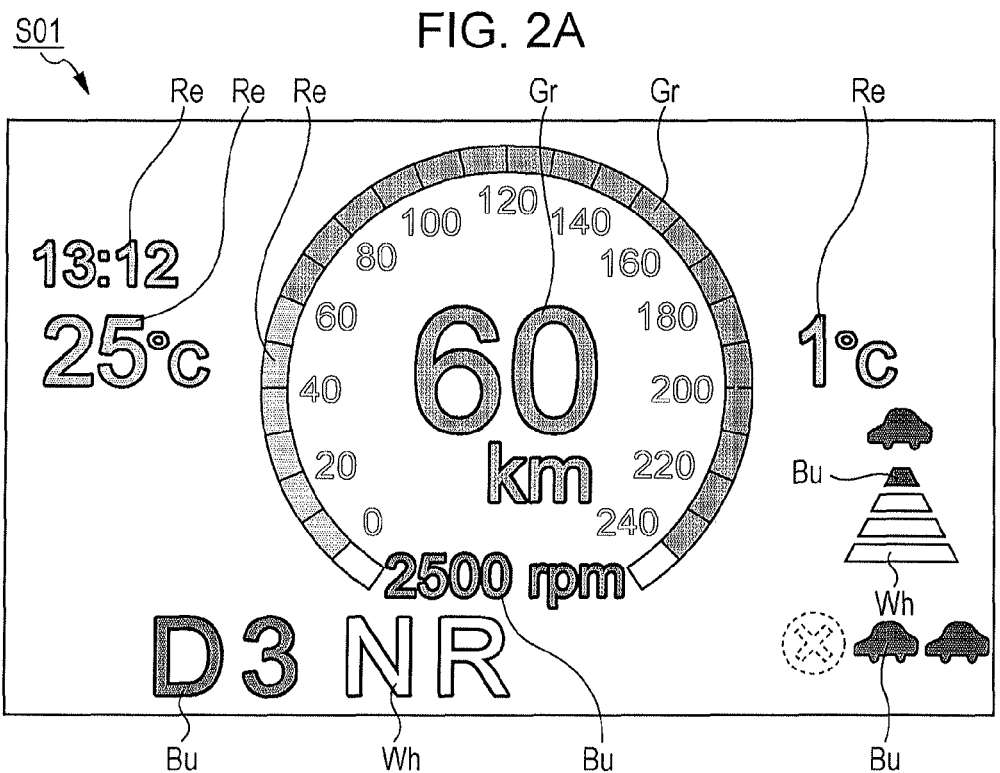
FIGS. 2A and 2B are schematic diagrams each illustrating display image examples in the image display apparatus according to the first embodiment.
Figure 2B:
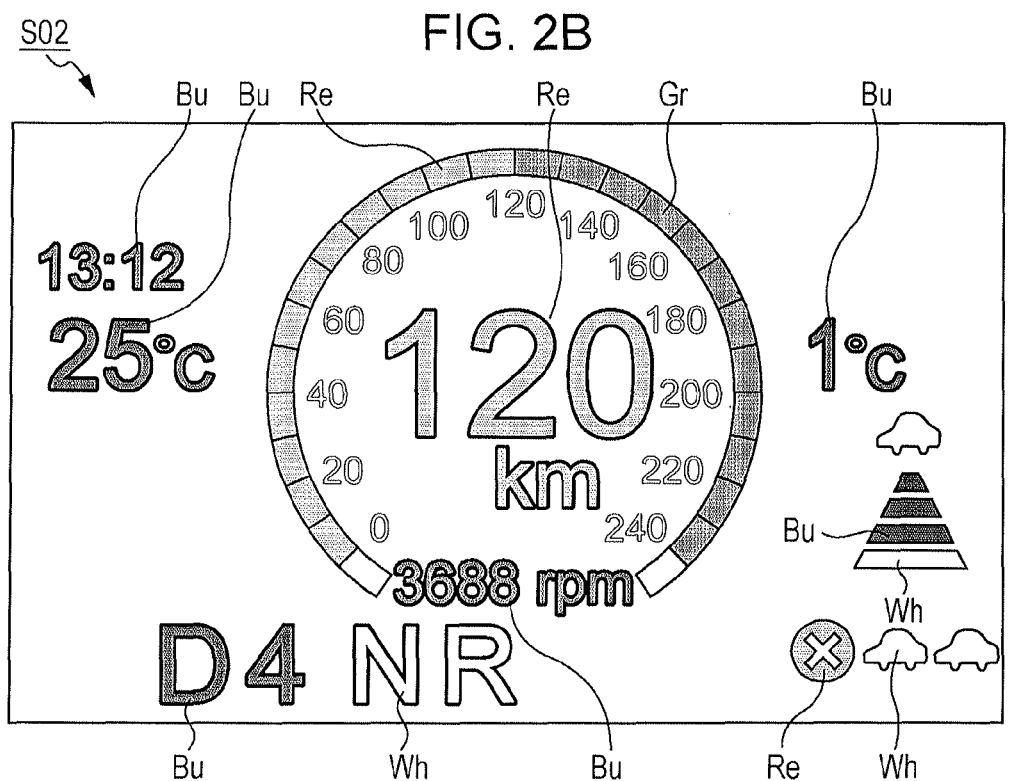
Figure 3:
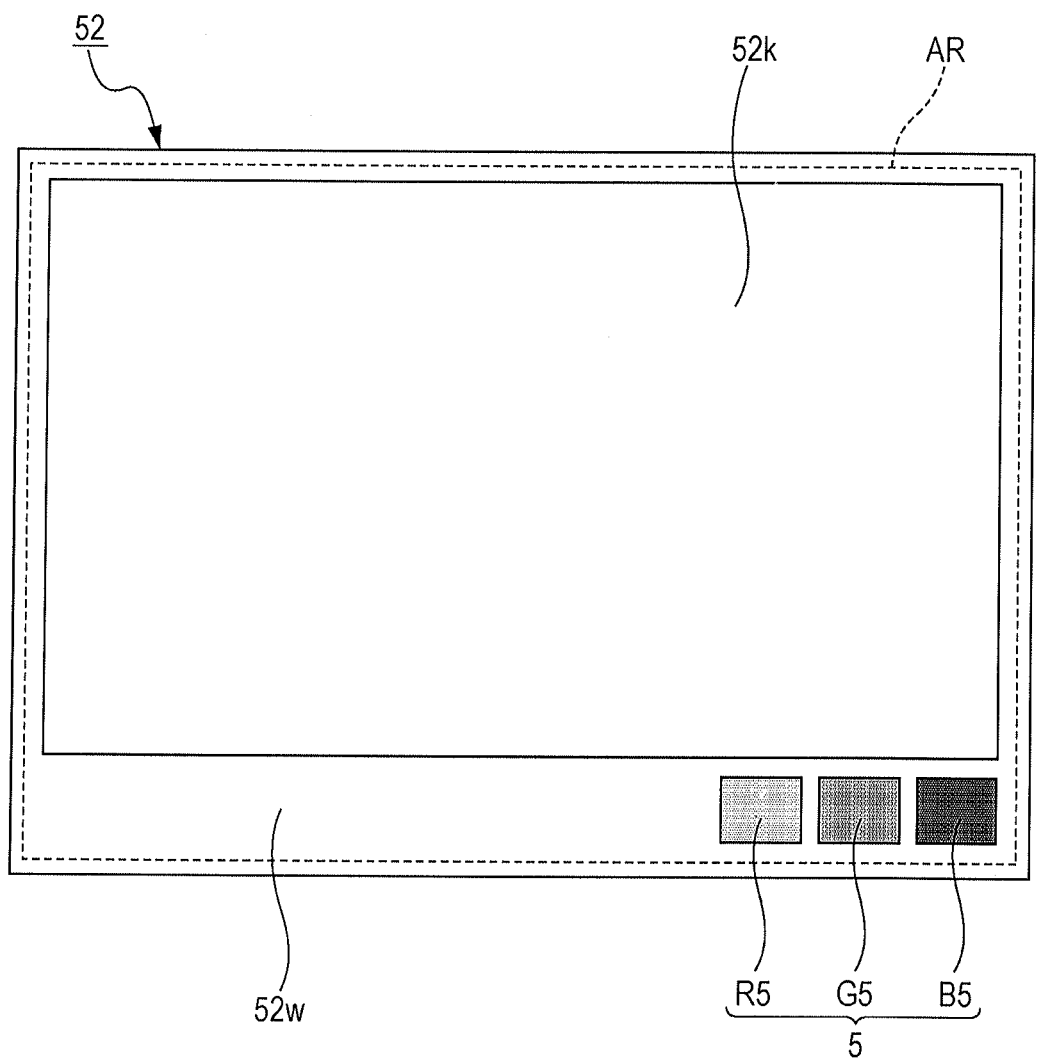
FIG. 3 is a plan view illustrating a slitter in FIG. 1 and explains the image display apparatus according to the first embodiment.
Figure 4A:
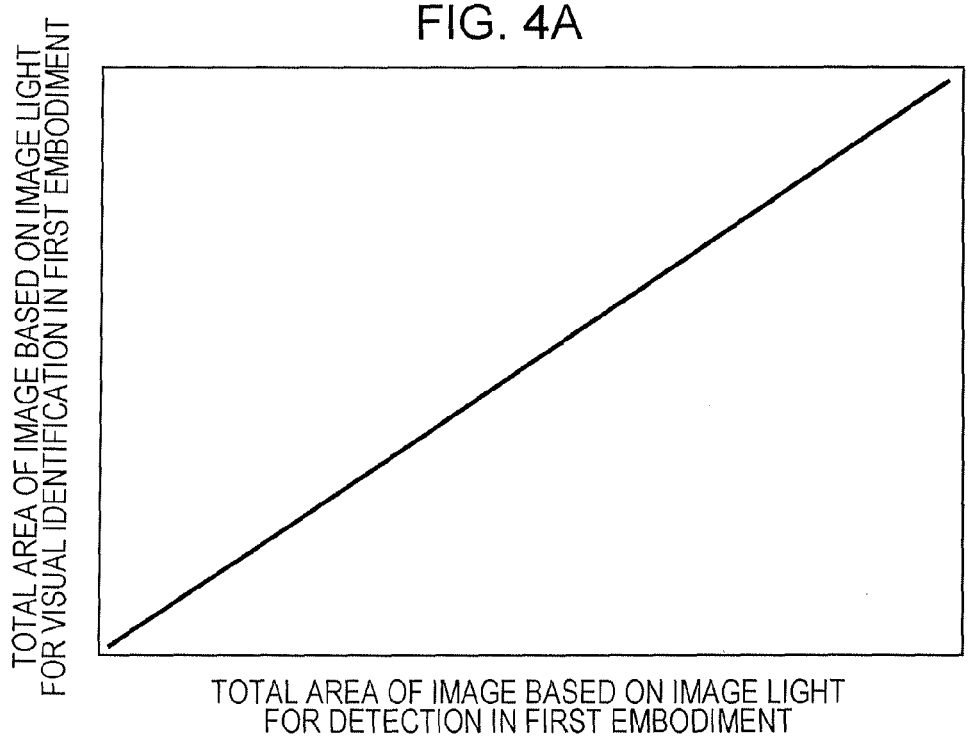
FIGS. 4A and 4B are diagrams explaining advantages of the image display apparatus according to the first embodiment, FIG. 4A being a graph illustrating the relationship between image light for visual identification and image light for detection, FIG. 4B being a graph illustrating the relationship between image light and sample light in Related Art 1.
Figure 4B:

FIG. 1 is a schematic diagram explaining an image display apparatus 101 according to a first embodiment of the present invention. FIG. 1 illustrates a case where the image display apparatus 101 is mounted in a vehicle and a viewer (driver) ST views an image VM projected in front of a windshield FG. FIGS. 2A and 2B are schematic diagrams illustrating display image examples in the image display apparatus 101 according to the first embodiment of the present invention. FIG. 2A illustrates a display image example S01 of a scene 01 and FIG. 2B illustrates a display image example S02 of a scene 02. FIG. 3 is a plan view illustrating a slitter 52 in FIG. 1 and explains the image display apparatus 101 according to the first embodiment of the present invention. FIGS. 4A and 4B are diagrams explaining advantages of the image display apparatus 101 according to the first embodiment of the present invention. FIG. 4A is a graph illustrating the relationship between image light for visual identification and image light for detection. FIG. 4B is a graph illustrating the relationship between image light and sample light in Related Art 1.

As illustrated in FIG. 1, the image display apparatus 101 according to the first embodiment of the present invention includes a light source LS to emit coherent light Lc, a holographic optical element 1 to diffract the coherent light Lc from the light source LS, an optical mechanism OP to guide image light Lf from the holographic optical element 1, a detection unit 5 to detect the intensity of the image light Lf, and an adjustment unit 7 to adjust the power of the light source LS.

The image display apparatus 101 according to the first embodiment of the present invention is mounted in the vehicle and is used as an HUD, as illustrated in FIG. 1. The image display apparatus 101 allows the adjustment unit 7 to adjust the power of the light source LS based on a result of detection by the detection unit 5 and allows the image VM based on the image light Lf obtained by adjustment to be observed (or visually identified) by the viewer ST.

The viewer ST driving the vehicle visually identifies a display screen on which display image components change as illustrated in, for example, FIGS. 2A and 2B, in real time. As regards display image components on the display screen to be visually identified, for example, the scene 01 (or the display image example S01) of FIG. 2A includes display image components in green Gr indicating segment bars of a speedometer and kilometers per hour, display image components in red Re indicating segment bars of the speedometer, time, and temperatures, display image components in blue Bu indicating revolutions per minute (rpm), inter-vehicle spacing, vehicle marks, and a drive position, and display image components in white Wh indicating drive positions unused and inter-vehicle spacing.

For example, the scene 02 (or the display image example S02) of FIG. 2B includes a display image component in green Gr indicating only the segment bars of the speedometer, display image components in red Re indicating the segment bars of the speedometer, kilometers per hour, and warning light, display image components in blue Bu indicating rpm, inter-vehicle spacing, and a drive position, and display image components in white Wh indicating drive positions unused, inter-vehicle spacing, and vehicle marks.

As described above, the shapes and colors of display image components on the display screen change at all times depending on a driving condition or setting by the viewer ST. The proportion of the area of a display image component of each color to the display screen accordingly changes. The image display apparatus 101 according to the first embodiment is intended to reduce unevenness in brightness of the image VM to be visually identified (refer to FIG. 1) if the area of a display image component changes as described above.

Referring to FIG. 1, the light source LS of the image display apparatus 101 according to the first embodiment may include three light sources LS (LSR, LSG, and LSB) of three colors, red, green, and blue. Although not illustrated in detail, three semiconductor laser elements are used to emit red light, green light, and blue light. Since the light sources LS include the semiconductor laser elements, the light sources LS can emit the coherent light Lc having high coherence. In addition, since the multiple light sources LS (three light sources in the first embodiment) are arranged, a plurality of colors can be used for the image VM to be visually identified by the viewer ST. Thus, the image VM can be enhanced in quality of expression. As regards the semiconductor laser elements, for example, a semiconductor laser element to emit light having a wavelength of 642 nm may be used for red light, a semiconductor laser element to emit light having a wavelength of 515 nm may be used for green light, and a semiconductor laser element to emit light having a wavelength of 445 nm may be used for blue light. Although the first embodiment of the present invention suitably uses the semiconductor laser elements in order to obtain the coherent light Lc having high coherence, the present invention is not limited to this example. For example, coherent light can be produced by allowing monochromatic light, for example, light emitted from a sodium lamp, to pass through a pin hole. Such a light source may be used.

The holographic optical element 1 has a function of diffracting the coherent light Lc from the light sources LS to produce the image light Lf. Specifically, the first embodiment of the present invention uses phase modulation liquid crystal on silicon (LCOS). When the coherent light Lc is applied to a hologram pattern written on the phase modulation LCOS, diffracted light is generated. The diffracted light passes through a Fourier lens FL1 illustrated in FIG. 1, so that the resultant light travels as the image light Lf. The intensity and phase of light is recorded as the hologram pattern.

As illustrated in FIG. 1, the holographic optical element 1 is connected to an LCOS driver 51. The LCOS driver 51 has a function of writing a hologram pattern generated by a central processing unit 71 on the phase modulation LCOS as needed.

The optical mechanism OP is mainly composed of optical components to guide the image light Lf from the holographic optical element 1. According to the first embodiment of the present invention, as illustrated in FIG. 1, the optical mechanism OP includes plane mirrors 12 and 22 to change an optical path, an optical lens 32 to converge or collimate light, the slitter 52 to define a display range of the display screen, a diffuser 13 to diffuse the image light Lf, and an optical lens 42 to converge or collimate the coherent light Lc from the light sources LS.

As illustrated in FIG. 3, the slitter 52 has an opening 52k through which most of the image light Lf passes through and includes a black frame 52w that partly blocks the image light Lf. The opening 52k corresponds to a portion of an area irradiated with the image light Lf (or area AR surrounded by a dashed line in FIG. 3). This portion corresponds to the display range of the image VM (refer to FIG. 1) to be visually identified by the viewer ST and the display range includes display image components.

Referring to FIG. 1, the diffuser 13 is disposed on the optical path behind the slitter 52 and diffuses the image light Lf passing through the diffuser 13. The diffuser 13 is connected to a drive unit 13d that drives the diffuser 13. The drive unit 13d turns the diffuser 13, thus reducing the directivity of the image light Lf, which is the coherent light Lc. This results in a reduction in speckle pattern caused by the coherent light Lc. Thus, the quality of the image VM visually identified by the viewer ST can be increased. The term "speckle pattern" used herein means a fine interference fringe caused by mutual interference of light rays scattered by parts of an object when light having high coherence is applied to the object. Although the diffuser 13 is turned in the first embodiment of the present invention, the diffuser 13 may be moved by vibration, for example.

The plane mirrors 12 and 22 and the optical lenses 32 and 42 are optical components which are in general use and have no special specifications. The optical mechanism OP may include various filters to prevent adverse effects of daylight and the filters may be arranged on the optical path. Curved mirrors may be used instead of the plane mirrors 12 and 22. The combination of the components of the optical mechanism OP is not limited to the illustration in FIG. 1.

The detection unit 5 detects the intensity of the image light Lf. Referring to FIGS. 1 and 3, the detection unit 5 is disposed near the slitter 52. The detection unit 5 may include three detection units, a detection unit R5, a detection unit G5, and a detection unit B5 corresponding to the three light sources LSR, LSG, and LSB, respectively. The detection units R5, G5, and B5 detect the intensities of the image light Lf of the different colors, red, green, and blue, respectively, applied to the detection units, Each detection unit 5 suitably includes a photodiode (PD). The detection units R5, G5, and B5 are arranged within the area irradiated with the image light Lf (or the area AR surrounded by the dashed line in FIG. 3).

In the first embodiment of the present invention, a display image projected on a light receiving area of each detection unit 5 is the same as a display image projected on the area irradiated with the image light Lf (or the area AR surrounded by the dashed line in FIG. 3). Consequently, the total area of the display image based on the image light for detection is substantially proportional to the total area of the display image based on the image light for visual identification as illustrated in FIG. 4A.

Figure 5:
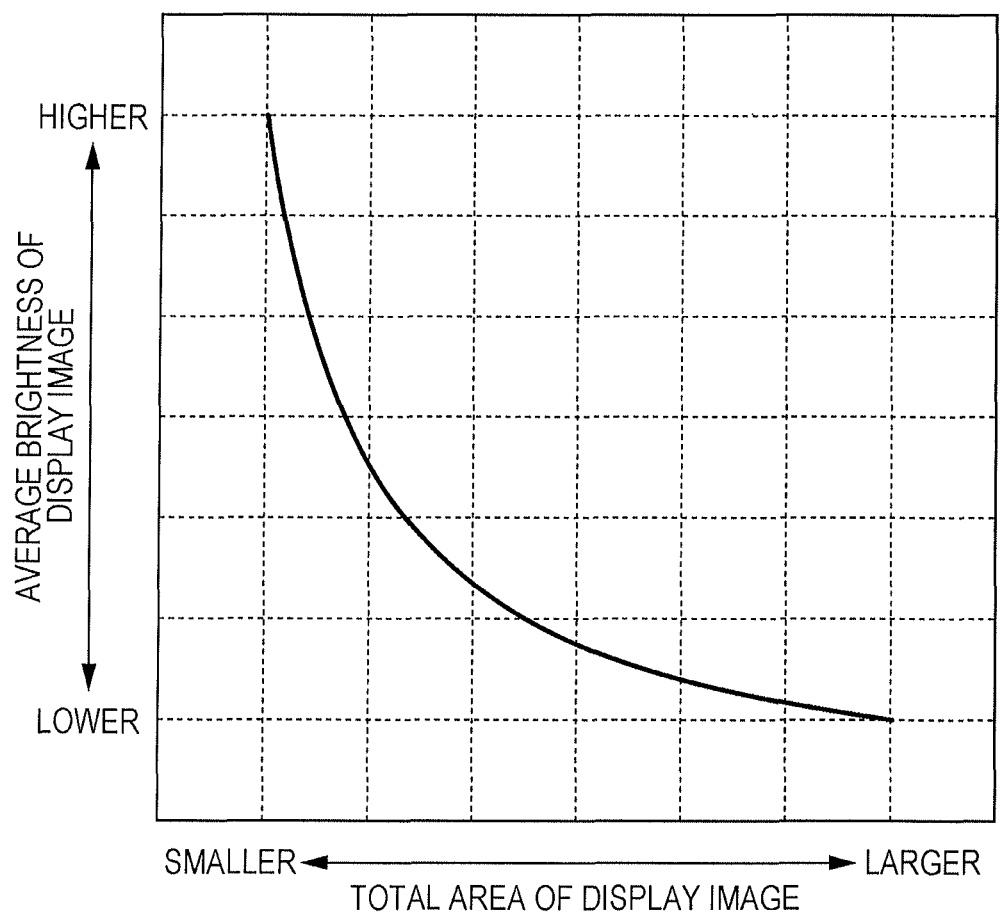
FIG. 5 is a graph illustrating the relationship between the total area of a display image and the average brightness of the display image in an image display apparatus including a holographic optical element.
Figure 6A:
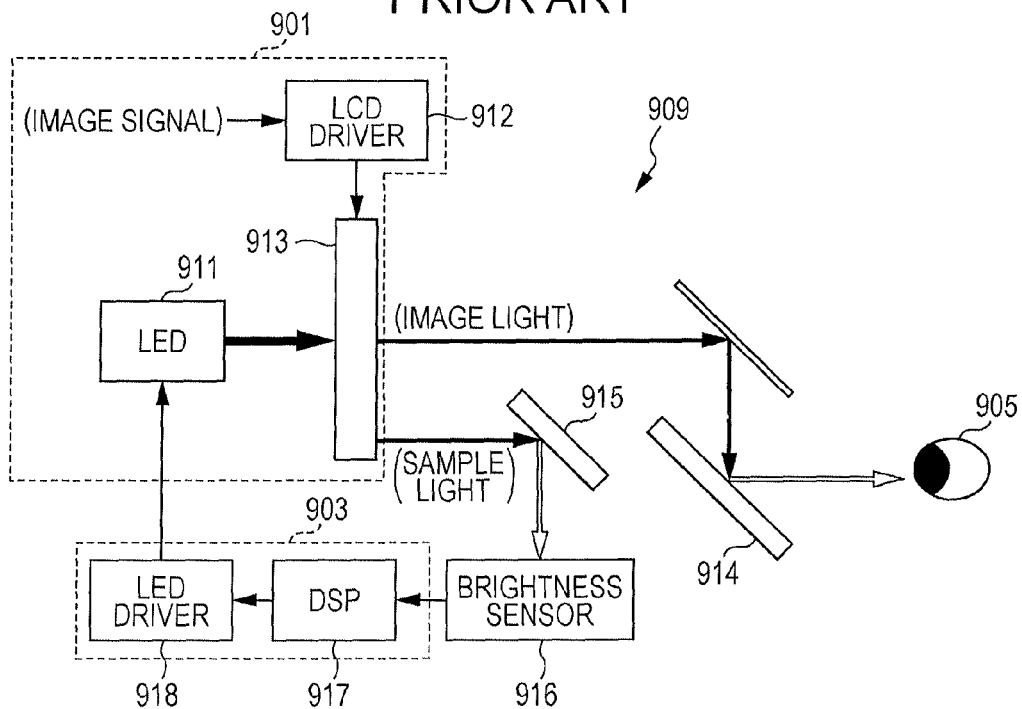
FIGS. 6A and 6B are diagrams explaining an HOE display apparatus according to Related Art 1, FIG. 6A being a schematic diagram of the HOE display apparatus, FIG. 6B explaining light emerging from an LCD.
Figure 6B:
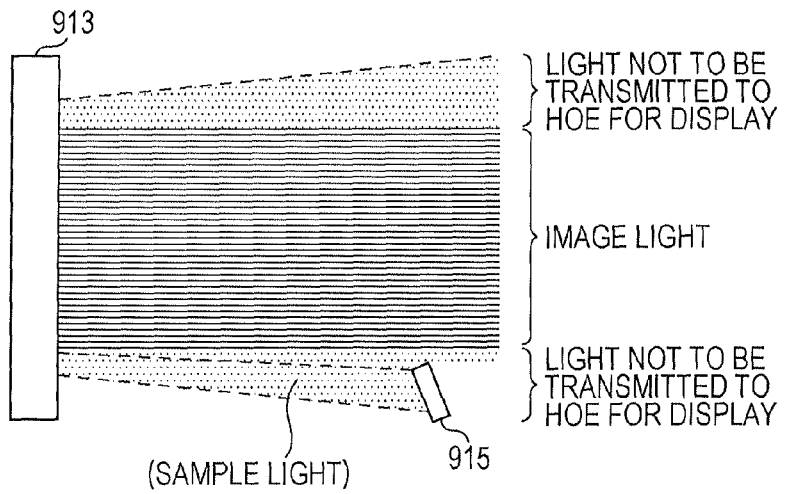
Figure 7A:
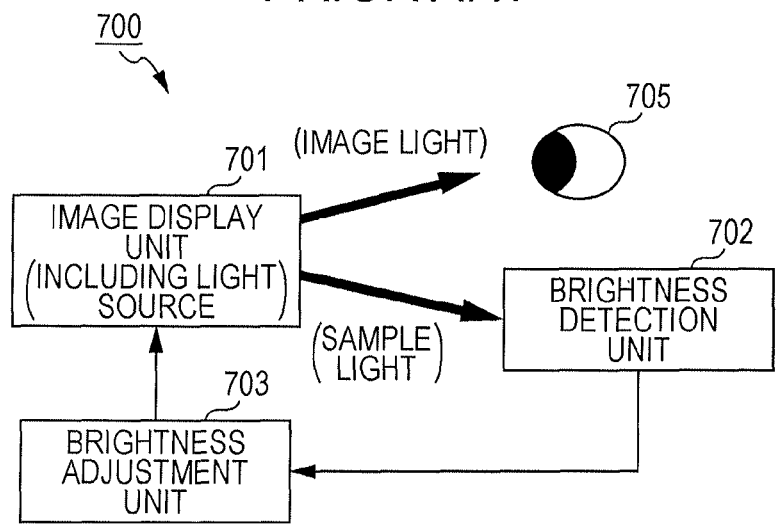
FIGS. 7A and 7B are diagrams explaining related-art image display apparatuses, FIG. 7A being a schematic diagram of an image display apparatus according to Related Art 2, FIG. 7B being a schematic diagram of an image display apparatus according to Related Art 3.
Figure 7B:
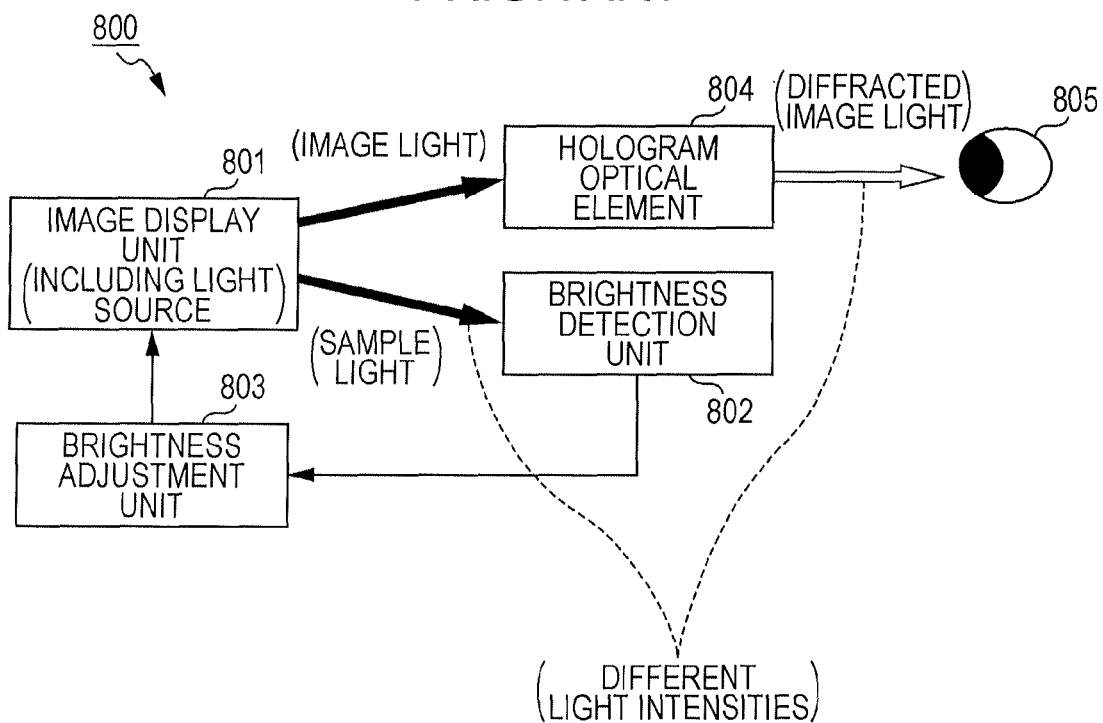

Furthermore, the total area of the display image based on the image light for detection is inversely proportional to the average brightness of the display image as illustrated in FIG. 5. Since the detection units 5 (R5, G5, and B5) detect the same image light Lf as that for the image VM to be displayed, a change in brightness of a display image component included in the displayed image VM (refer to FIG. 1) depending on the area of the display image component can be accurately dealt with based on the result of detection by the detection units 5 (R5, G5, and B5). Thus, the brightness can be accurately corrected.

On the other hand, since the image light distinctly differs from the sample light in Related Art 1, the total area of a display image based on the sample light for detection is not proportional to the total area of a display image based on the image light. The relationship therebetween is illustrated by a wavy line in FIG. 4B. A variation in total area of a display image significantly accounts for a change in brightness of the display image. In addition, since the total area of the display image based on the sample light for detection and the average brightness thereof do not have an inversely proportional relationship therebetween as illustrated in FIG. 5, the brightness of the image light cannot be accurately corrected based on the sample light.

The adjustment unit 7 adjusts the power of the light sources LS based on the result of detection by the detection units 5. Referring to FIG. 1, the adjustment unit 7 is connected to the detection units 5 (R5, G5, and B5). The adjustment unit 7 includes an automatic power control (APC) 17 to automatically control the power of the light sources LS and a light source driver 27, connected to the light sources LS, to drive the light sources LS. Consequently, the adjustment unit 7 adjusts the power of the light sources LS so that the brightness of the displayed image VM can be maintained even or constant if a display image component of the displayed image VM changes. The APC 17 has a function of adjusting a change in power of the light sources LS depending on a change in temperature caused by heat generated from the light sources LS in addition to the above-described function of adjusting the power of the light sources LS based on the result of detection by the detection units 5.

Advantages of the image display apparatus 101 according to the first embodiment of the present invention will be described below.

The image display apparatus 101 according to the first embodiment of the present invention is configured such that the detection units 5 (R5, G5, and B5) detect the intensity of the image light Lf from the holographic optical element 1 and the adjustment unit 7 adjusts the power of the light sources LS based on the result of detection by the detection units 5 (R5, G5, and B5). Accordingly, the power of the light sources LS is allowed to depend on the intensity of the image light Lf. Consequently, a change in brightness of a display image component included in the displayed image VM depending on the area of the display image component can be accurately dealt with based on the result of detection by the detection units 5 (R5, G5, and B5) which detect the same image light Lf as that for the displayed image VM. The adjustment unit 7 adjusts the power of the light sources LS so that the brightness of the displayed image VM can be maintained even or constant if a display image component included in the displayed image VM changes. Advantageously, the image display apparatus 101 can reduce unevenness in brightness of the image VM to be visually identified by the viewer ST.

Since the multiple light sources LS are arranged, the image VM to be visually identified by the viewer ST is allowed to have a plurality of colors. Thus, the image VM can be enhanced in quality of expression. Additionally, since the multiple detection units 5 are arranged in correspondence to the respective light sources LS, the adjustment unit 7 can adjust the power of each light source LS depending on the area of a display image component of the color corresponding to the light source. Thus, the brightness of each color of the displayed image VM can be maintained even or constant.

Since the optical mechanism OP includes the diffuser 13 which is driven, the directivity of the image light Lf, which is the coherent light Lc, can be reduced. Thus, the speckle pattern caused by the coherent light Lc can be reduced, thus increasing the quality of the image VM to be visually identified by the viewer ST.

The present invention is not limited to the above-described embodiment. For example, the following modifications of the foregoing embodiment may be made. Such modifications are also intended to fall within the scope of the present invention.

First Modification

Although the first embodiment is suitably configured such that a display image projected on the light receiving area of each detection unit 5 is the same as that projected on the area irradiated with the image light Lf (or the area AR surrounded by the dashed line in FIG. 3), part of the display image projected on the area irradiated with the image light Lf (or the area AR surrounded by the dashed line in FIG. 3) may be projected on the light receiving area of each detection unit 5. Alternatively, a solid image pattern that differs from a display image projected on the area irradiated with the image light Lf may be projected on the light receiving area of each detection unit 5 so as to extend over the light receiving area. In this case, since the total area of the display image based on the image light Lf and the average brightness of the display image have an inversely proportional relationship as illustrated in FIG. 5, the brightness of the image light Lf can be accurately corrected based on the solid image pattern extending over the light receiving area of each detection unit 5.

Second Modification

Although the image display apparatus 101 according to the first embodiment suitably includes the three light sources LS (LSR, LSG, and LSB) of the three colors, red, green, and blue, the apparatus may include four light sources LS of four colors, red, green, blue, and yellow. Alternatively, the apparatus may include two light sources LS of two colors, for example, red and green. Alternatively, the apparatus may include a light source of a single color, for example, green.

Third Modification

Although the first embodiment is suitably configured such that the diffuser 13 is disposed on the optical path behind the slitter 52, it is only required that the diffuser 13 is disposed on the optical path downstream of the Fourier lens FL1.

Fourth Modification

Although the first embodiment has been described with respect to the application to the HUD mounted in the vehicle, the present invention is not limited to this application. For example, the present invention is applicable to, for example, a three-dimensional display or an HMD.

The present invention is not limited to the above-described exemplary embodiment and modifications, and variations may be appropriately made within the intended scope of the present invention.

What is claimed is:

1. An image display apparatus comprising:
    at least one light source that emits coherent light;
    a holographic optical element that diffracts the coherent light from the light source;
    a Fourier lens that receives diffracted light from the holographic optical element to produce image light;
    an optical mechanism that guides the image light from the Fourier lens, wherein the optical mechanism includes a slitter and a diffuser, the slitter disposed in an imaging position of the Fourier lens and having an opening through which most of the image light from the holographic optical element passes and a frame that partially blocks the image light from the holographic optical element, the slitter defining a display range of the image to be viewed by the viewer, and the diffuser disposed in an optical path behind the slitter;
    at least one detection unit that detects intensity of the image light from the Fourier lens, the detection unit being disposed in the optical path after the holographic optical element; and
    an adjustment unit that adjusts power of the light source based on a result of detection by the detection unit; and
    wherein a display image, having a display image component, based on the image light is observable by a viewer and an image based on the image light incident to the detection unit are the same image, and wherein a change in brightness of the display image component depends on an area of the display image component.

2. The apparatus according to claim 1,
wherein the at least one light source comprises a plurality of light sources, and
wherein the at least one detection unit comprises a plurality of detection units corresponding to the plurality of light sources.

\* \* \* \* \*